Jan. 13, 1970   W. H. W. SCHULLER   3,489,542
METHOD AND APPARATUS FOR MAKING THERMOPLASTIC FIBERS
Filed May 11, 1966

INVENTOR.
Werner Hugo Wilhelm Schuller
BY
Michael S. Striker
Atty

United States Patent Office 3,489,542
Patented Jan. 13, 1970

3,489,542
METHOD AND APPARATUS FOR MAKING THERMOPLASTIC FIBERS
Werner Hugo Wilhelm Schuller, Dr. Kurt Huber Str. 14, Munich-Grunwald, Germany
Filed May 11, 1966, Ser. No. 549,274
Claims priority, application Austria, May 11, 1965,
A 4,265/65
Int. Cl. C03b 37/00
U.S. Cl. 65—2
13 Claims

ABSTRACT OF THE DISCLOSURE

A method and an apparatus for adding bodies of thermoplastic material from a supply to a mass of molten thermoplastic material contained in a crucible. The crucible is supplied with heat energy to maintain the thermoplastic material therein in molten state and so that the crucible radiates some of the heat energy. The additional bodies are individually supplied along a predetermined path so that as they are approaching the crucible they are heated by the radiated heat energy. The thus pre-heated individual bodies are placed successively into direct heat-exchanging contact with the crucible so that they are directly heated and melt to thereupon unite with the mass of thermoplastic material in the crucible.

---

Figure 1:
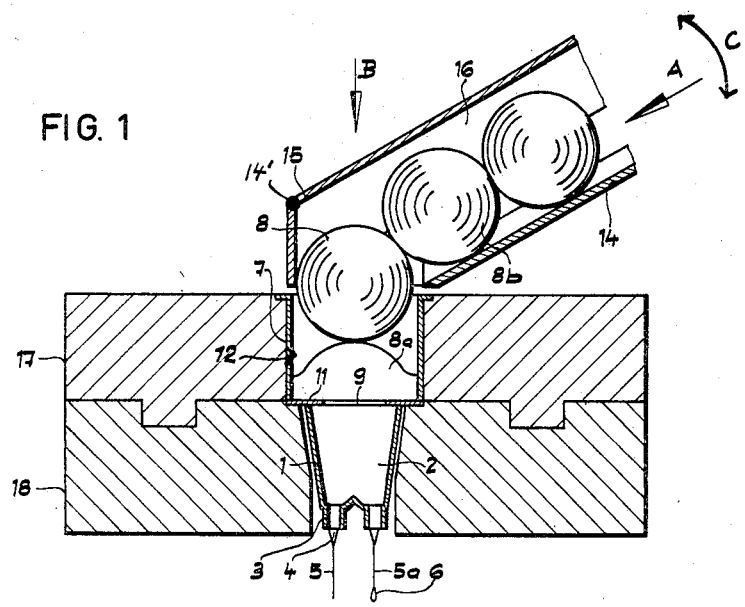

Generally speaking, the present invention relates to a method for handling thermoplastic materials. More specifically, the invention relates to a method leading to the production of fibers from such thermoplastic materials. Still more specifically, the invention relates to a method of adding bodies of thermoplastic material, and particularly of such vitreous material as glass, from a supply of such bodies to a mass of molten thermoplastic material contained in a crucible. The invention also relates to an apparatus for carrying out the above method.

The production of fibers from molten thermoplastic material, and particularly from molten glass, requires continuous replenishment of the molten mass as portion thereof are withdrawn from the crucible in the form of fibers. Two basic methods are known for this. One of these is to continuously melt raw material in a separate crucible or furnace and to continuously add a stream of this molten raw material to the mass in the crucible from which the fibers are being withdrawn. This is known as the "feeder" method. The other basic approach is to continuously add glass bodies, generally spheres of glass, to the molten mass of material in the crucible, the speed of such addition being governed by the withdrawal of molten material from the crucible in form of filaments. This is known as the "marble" method and has found wide acceptance in the industry since the raw material spheres are rather easy to manufacture and to store, are inexpensive and readily obtainable, and are simple to handle. Furthermere, this particular method permits intermittent replenishment of the molten material in the crucible by adding thereto identical quantities of raw material at intermittent times so that the replacement can be correlated very closely with the withdrawal of raw material from the crucible.

Proposals have also been made which in effect combine the "feeder" method with the "marble" method in that the glass spheres are initially conducted into a premelting chamber outside of the crucible which contains the mass of molten material, are there melted, and are then added to the mass of molten material in form of a stream or as drops.

Mention has been made that fibers are withdrawn from the crucible containing the mass of molten material. Such crucibles are generally constructed in the manner that their bottom wall is provided with a great number of individual nozzles from which the molten material exudes, so that the process of filament formation can begin. Usually, such crucibles are round or quadratic furnaces of 300–400 mm. length or diameter which are heated electrically or with gas, and which consist of ceramic or metallic material capable of withstanding the high temperatures required. The bottom wall usually consists of platinum or platinum alloy and it is this wall which is provided with the nozzles for exuding of the molten material. The top wall of the crucible is generally provided with a more or less central opening through which, if the "marble" method of raw material supply is used, the spheres are introduced into the crucible. The rate of feeding of the spheres into the crucible can be governed by different factors. For instance, it can be determined by a control which measures the level of the molten material in the crucible, or the spheres can be intermittently added at a rate corresponding to the rate of withdrawal of molten material from the crucible, such rate having been determined by prior tests.

All devices utilizing the "marble" method of material feeding which are known to me, suffer from a common drawback attempts at whose elimination have caused industry considerable difficulties. No solution has heretofore been found for this problem, namely for the fact that the constant viscosity of the molten mass, which is required if the continuous fiber production is to proceed smoothly, is adversely effected by the introduction of cold spheres of raw material dropping into the mass of molten material. The term which has been developed for this is "cold-shock."

To overcome this problem attempts have been made to utilize a pre-melting chamber in which the spheres are completely or partially premelted and then introduced into the crucible. However, such attempt have been found to be impractical and uneconomical since the premelting chamber had to be heated separately from the furnace and required a considerable expenditure of heat energy. Furthermore, inasmuch as only as great a quantity of raw material could be melted in the premelting chamber as corresponded to the withdrawal of material from the crucible, a complicated and very exact system of control arrangements between the crucible and the pre-melting chamber was required to coordinate the operation of the one with the other. Finally, whenever, withdrawal of the fibers had to be interrupted for any reason whatever, such arrangements required stopping of the sphere supply, the pre-melting chamber and the crucible in a precise predetermined order and timing.

A further drawback of all methods known to me is that the crucibles are subject to deformation under the intense heat of the molten material contained therein. Thus, although the use of larger crucibles would be highly desirable for increasing the economy of operation, in actual practice a diameter or a length of 300–400 mm. for such crucibles is not exceeded. This size limitation, however, adversely affects the number and arrangement of the withdrawal nozzles, inasmuch as the relatively small area of the bottom wall of the crucible requires that the nozzles be very close together if, for instance, the international standard of 102 or 204 nozzles is to be obtained. Such close proximity of the nozzles means in practice that, if a filament ruptures for any reason, the globule of molten material which exudes from the nozzle in question preparatory to resumption of filament production by this nozzle, and whose weight will result in the formation of the initial length of filament, will contact the adjacent filaments and will thereby facilitate breakage of the latter. Therefore, it is in these arrangements practically impossible to depend on filament-initiation by exudation of such globules, since the nozzles are so close together that the formation of globules of adequate size and therefore the weight requisite for starting the initial length of filament connot be permitted.

It is a general object of the present invention to overcome the drawbacks set forth above with respect to the prior art.

A more specific object of the invention is to provide a method of adding bodies of thermoplastic material from a supply of such bodies to a mass of thermoplastic material contained in a crucible.

Still a more specific object of the invention is to accomplish the aforementioned objects without inducing in the mass of molten material in the crucible the so-called "cold-shock."

An additional object of the invention is to provide a method which is simple and economical in its operation.

It is also an object of the invention to provide an apparatus for carrying out the method.

In accordance with one feature of my invention I therefore provide a method of adding bodies of thermoplastic material, such thermoplastic material being particularly of the vitreous type, such as glass. The bodies are supplied from a source of such bodies to a mass of molten thermoplastic material contained in a crucible and the method comprises the steps of supplying heat energy to the crucible so as to maintain the thermoplastic materal therein in molten state. Furthermore, the heat energy supplied to the crucible is enabled to radiate therefrom to some extent. The bodies of thermoplastic material are then supplied individually along a predetermined path so that individual ones of these bodies which approach the crucible are heated by the heat energy which is radiated from the latter. Finally, successive ones of these preheated bodies are placed into direct heat-exchange contact with the crucible so that they are directly heated thereby in response to such contact. This causes the bodies to melt and to unite with the mass of thermoplastic material contained in the crucible.

An apparatus suitable for continuously adding such bodies to the mass of molten thermoplastic material comprises a crucible in which the mass of thermoplastic material is contained. Means are provided for heating the crucible so as to maintain the mass in molten state and so that the crucible radiates some of the thus imparted heat energy. I further provide preheating chamber means which is positioned so as to be heated by the radiated heat energy, and feed means for feeding the bodies along a predetermined path, through the chamber means and toward the crucible. The bodies are preheated during their travel along the predetermined path, and subsequently engage an aperted partition which separates the crucible from the chamber means and which is in direct heat-exchanging contact with the crucible. The bodies are heated directly by contact with this partition and are melted thereby, so as to pass in molten state through the partition and into the crucible to join the molten mass therein.

It will be understood, of course, that the bodies can be provided in various different forms and that they need not necessarily be in the form of spheres. Rather, squares, rectangles, octagons or similar configurations are suitable for the purpose as long as they do not have sharp corners or edges which could cause them to jam during feeding along the predetermined path and to thereby block the same.

Figure 2:
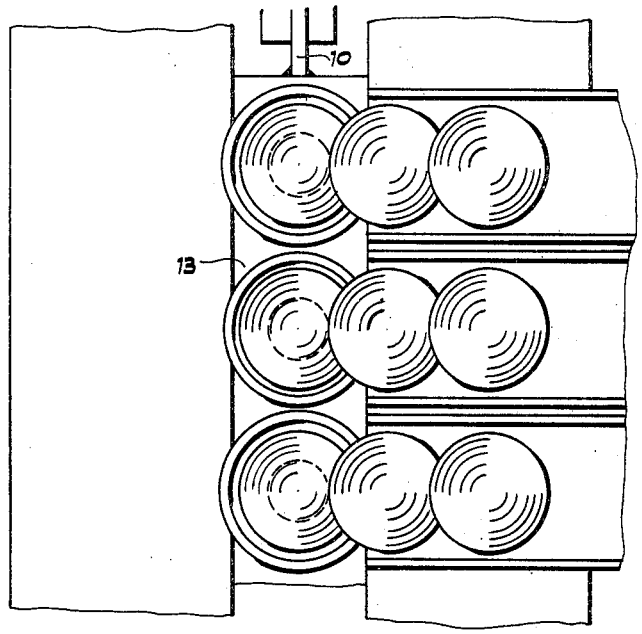

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

FIG. 1 is a transverse section through an apparatus in accordance with the present invention; and FIG. 2 is a top-plan view taken in the direction of the arrow B in FIG. 1.

Discussing now the drawing in detail, and firstly FIG. 1 thereof, it will be seen that there is shown a crucible 1 which contains a mass 2 of molten thermoplastic material, particularly vitreous material such as glass. The crucible 1 is provided in its bottom wall with a plurality of nozzles 3 (two shown) through which the mass of molten material exudes in form of globules 4 from which the filaments 5 are withdrawn. If one of the filaments 5 breaks, then a droplet 6 will form downwardly of the globule 5 and, by its weight, will withdraw from the latter a new filament 5a.

In accordance with the present invention there are arranged extending along the length of the crucible 1, which in the present embodiment is assumed to be elongated, pre-melt chambers 7 (only one shown) which are each adapted to receive at any one time an individual one of the bodies of raw material which latter in the present instance are assumed to be spheres generally designated with reference numeral 8. The bottom wall or walls of these pre-melt chambers 7 are arranged to be directly heated in conjunction with the crucible 1. In the illustrated embodiment it is assumed that the crucible 1 is heated electrically, as indicated by the presence of the electrode 10 shown in FIG. 2, and in this case the bottom wall of each of the pre-melt chambers 7 will be electrically connected with the crucible 1. The bottom wall of each chamber 7 is provided with an aperture 9, which is preferably centrally arranged, and which has a cross-sectional dimension smaller than the upper end of the crucible 1 with which it communicates. By virtue of this provision of such apertures 9 the bottom wall of each of the chambers 7 thus defines around these apertures 9 a shoulder 11. Of course, it will be understood that it need not be the bottom wall of the chambers 7 which latter may, in fact, be downwardly open without provision of any bottom wall, rather, the wall providing the shoulders 11 and in turn provided with the aperture 9 can also be a top wall of the crucible 1.

The operation of the novel device will be obvious from what has been said before and from a consideration of the drawing. The spheres of raw material, generally designated with reference numeral 8, are fed to the respective chambers 7 along an inclined path provided for each of these chambers in form of a chute 14 associated with each individual chamber 7. It has been found advantageous to provide these chutes with lateral walls 16 and with a top wall 15 to prevent the intrusion thereinto of contaminants, such as dust or grease, which would adversely affect the advancement of these spheres 8. Such chutes can be provided individually or in form of a common system, that is to say one can have a common bottom wall and a common top wall with the space between them subdivided by the lateral walls 16. In accordance with the invention the inclination of the chutes can be varied by movement about pivot point 14' in direction of arrow C for varying the pressure of the spheres which are guided in them on the respectively foremost sphere.

As each of the spheres 8 enters into the respective chamber 7 it engages the already partially melted previous sphere 8a. This sphere 8a has been melted by contact with the heated shoulder 11 and its material is gradually passing through the opening 9 into the crucible 1 to join the mass of molten material therein. As each of the spheres 8, which for ease of identification have been designated with reference numerals 8 and 8b in the chute 14, passes through the chute it is preheated by the heat energy radiating from the crucible 1 through the layers of firebrick 17, 18. Such preheating increases as the spheres approach closer to the point where they will enter into the chambers 7. The walls of the chambers 7 are not heated by the radiating heat energy and it should be noted that they are only indirectly heated by the heating for the crucible 1 inasmuch as there is no contact between them and the shoulders 11 which are so heated directly. The cross-sectional area of the chambers 7 is selected somewhat larger than the cross-section of the spheres 8 so that possibly developing air bubbles, generated during melting of the spheres in the chambers 7, can escape from the chambers.

The reason the walls 12 of the chambers 7 are not directly heated by the heating means for the crucible 1 lies in the fact that heating of the walls is desired only to the point where the spheres will not be so softened as to adhere to the walls. In other words, softening and melting occurs only when the spheres actually engage the shoulders 11. This eliminates the need for complicated control devices for advancing of the spheres.

The top wall 13 and/or the bottom wall of the chambers 7 which defines the shoulders 11 imparts considerable additional rigidity to the entire structure, including the crucible 1. The result of this is the elimination of deformations which hitherto occurred because of the great heat prevailing in the crucible. This makes it possible to make the crucible of greater diameter or, if it is elongated, to make it longer than herebefore possible and, of course, this in turn permits the use of a greater number of extrusion nozzles 3. Furthermore, the nozzles can also be placed farther apart and can be made to have a larger cross sectional area so that the formation of drops 6 is assured which are heavy enough to automatically start withdrawing of a filament without the danger of rupturing adjoining filaments by contact therewith.

It should also be mentioned that the feature of adjusting the inclination of the chute 14, to which reference has been had before, permits a control over the stage in the feeding process at which the individual spheres 8 first move into the range of heat radiation from the crucible 1 through the firebrick.

If a device in accordance with the present invention is used, and the crucible is for instance elongated and of a length of 1000 mm., the spheres having an international standard diameter of 22 mm., then 30 or more of the chutes 14 can be used with a single crucible 1. Of course, the bodies of a raw material need not to be formed as spheres, but can have other configurations as long as the individual bodies have approximately identical weight and no sharp corners which could cause jamming of the bodies in the chutes 14. The members 17 of 18 have been described earlier as being of firebrick, but it should be understood that they can be made of any suitable heat-resistant material which absorbs and forwards the heat radiated by the crucible 1. These members also serve to support the pre-melt chambers 7.

It will be understood that each of the elements described above, or two or more together, may also find a useful application in other types of method and apparatus for continuously adding solid bodies of thermoplastic material to a mass of molten thermoplastic material differing from the types described above.

While the invention has been illustrated and described as embodied in method and apparatus for continuously adding solid bodies of thermoplastic material to a mass of molten thermoplastic material, it is not intended to be limited to the details shown, since various modifications and structural changes may be made without departing in any way from the spirit of the present invention.

What is claimed as new and desired to be secured by Letters Patent is:

1. A method of adding bodies of fiberizable thermoplastic material, from a supply of these bodies to a mass of molten thermoplastic material contained in a crucible which is elongated in a substantially horizontal direction, comprising the steps of supplying the crucible with heat energy in amounts requisite for maintaining the mass of thermoplastic material therein in molten state; advancing to said crucible, in single-file formation from above and along at least two horizontally spaced inclined paths, respective pluralities of said bodies; intercepting the respectively leading individual bodies at melting stations proximal to but above the level of said mass; maintaining the respective leading bodies at said melting stations and subjecting them to direct heat exchange with the crucible until they melt and flow downwardly to unite with said mass; and maintaining the respectively succeeding bodies in heat-exchanging contact with the associated leading bodies while the latter are at said melting stations, so that said succeeding bodies are preheated by such contact prior to their advancing to the respective melting station in response to melting of the leading bodies.

2. A method as defined in claim 1, wherein at least that portion of each path which is near said crucible is inclined to said crucible so that said bodies are fed along said portion by gravity; and further comprising the step of altering the inclination of said portion.

3. A method as defined in claim 1, and further comprising the step of continuously withdrawing filaments from said molten mass at predetermined locations of said crucible.

4. A method as defined in claim 3, wherein the viscosity of the melted respectively leading bodies as the latter are added to said mass of molten thermoplastic material is greater than that of said material adjacent said predetermined locations.

5. A method as defined in claim 2, wherein the step of altering the inclination of said portion of each path comprises reducing the pressure of succeeding bodies upon leading bodies located in direct heat-exchanging contact with said crucible.

6. Apparatus for continuously adding solid bodies of fiberizable thermoplastic material to a mass of molten thermoplastic material, comprising a crucible elongated in substantially horizontal direction and having an upper open side; a mass of molten thermoplastic material contained in said crucible; heating means associated with said crucible for heating the same to a temperature requisite for maintaining said mass in molten state; guide means above said crucible and operative for guiding a plurality of said bodies in at least two horizontally spaced rows downwardly to said upper side with the bodies in each row being maintained in a single-file formation and in heat-exchanging abutment; and intercepting means carried by said crucible proximal to said upper side and in heat-exchanging relationship therewith, for intercepting the respective leading bodies above the level of said mass and for retaining the intercepted leading bodies out of contact with the mass while exchanging heat with them until they melt and flow downwardly to unite with the mass, the respectively succeeding bodies being preheated by contact with said leading bodies while the same are retained by said intercepting means.

7. Apparatus as defined in claim 6, wherein said crucible is provided with a plurality of withdrawal nozzles for withdrawing portions of said molten mass therefrom in filamentary form.

8. Apparatus as defined in claim 7, wherein the heating means is electric heating means heating said crucible, and wherein said intercepting means is electrically connected with said crucible so as to be heated by said electric heating means.

9. Apparatus as defined in claim 7, wherein said intercepting means is configured to accept at any one time a single leading body with small clearance therearound.

10. Apparatus as defined in claim 7, wherein said guide means comprises at least one chute.

11. Apparatus as defined in claim 10, wherein said chute is substantially closed.

12. Apparatus as defined in claim 10, wherein said chute is inclined with respect to a vertical plane of symmetry passing through said crucible.

13. Apparatus as defined in claim 12, and further comprising means for varying the inclination of at least a portion of said chute with respect to said vertical plane.

References Cited

UNITED STATES PATENTS

| 3,048,640 | 8/1962 | Glaser | 65—2 |
| 3,248,191 | 4/1966 | Canfield | 65—1 |

S. LEON BASHORE, Primary Examiner

R. S. LINDSAY, JR., Assistant Examiner

U.S. Cl. X.R.

18—8; 65—11, 134; 264—18